April 1, 1969  C. W. FRITZE ET AL  3,436,731
SYMBOL DETECTION
Filed March 11, 1960  Sheet 3 of 5

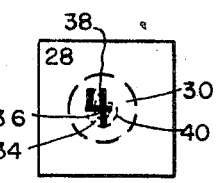
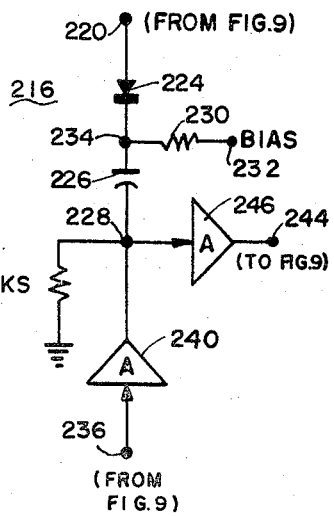
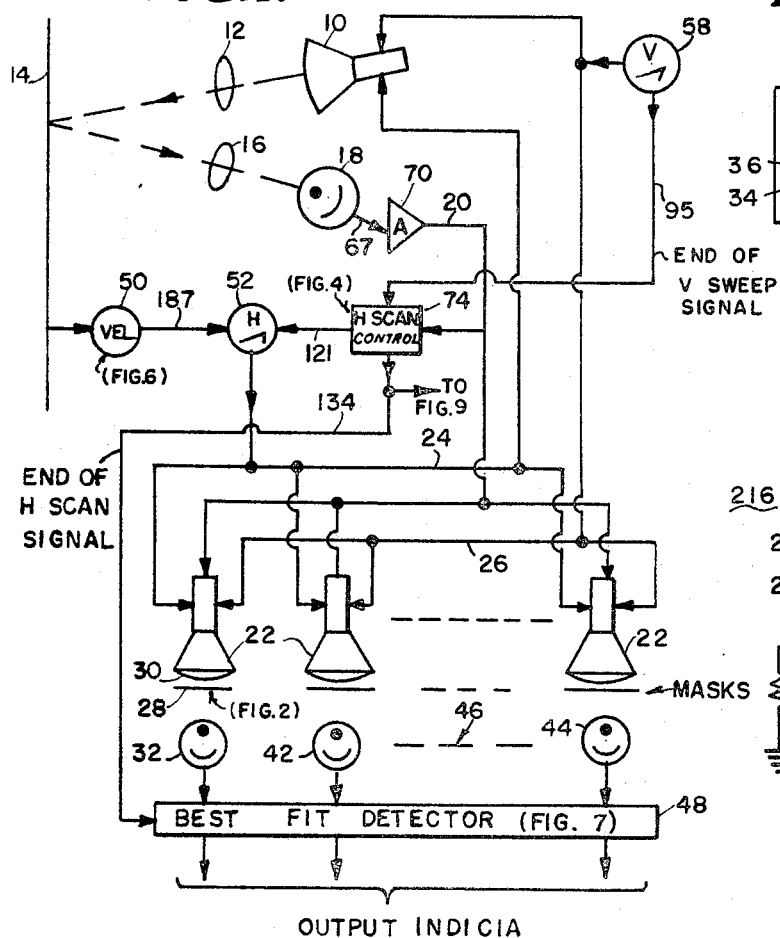
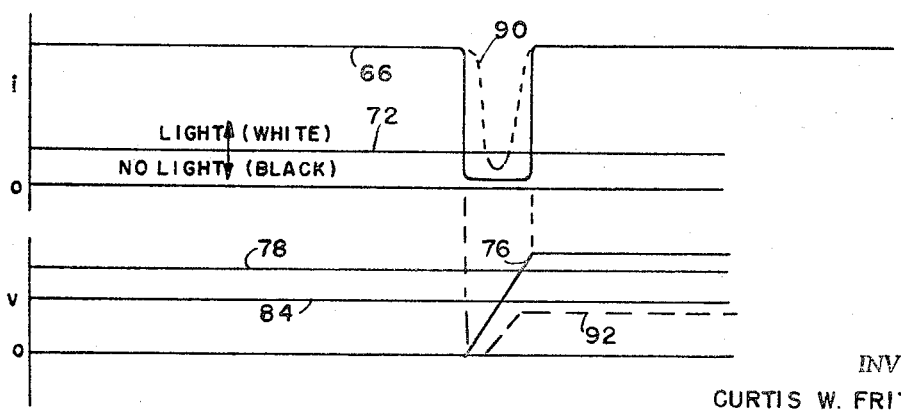

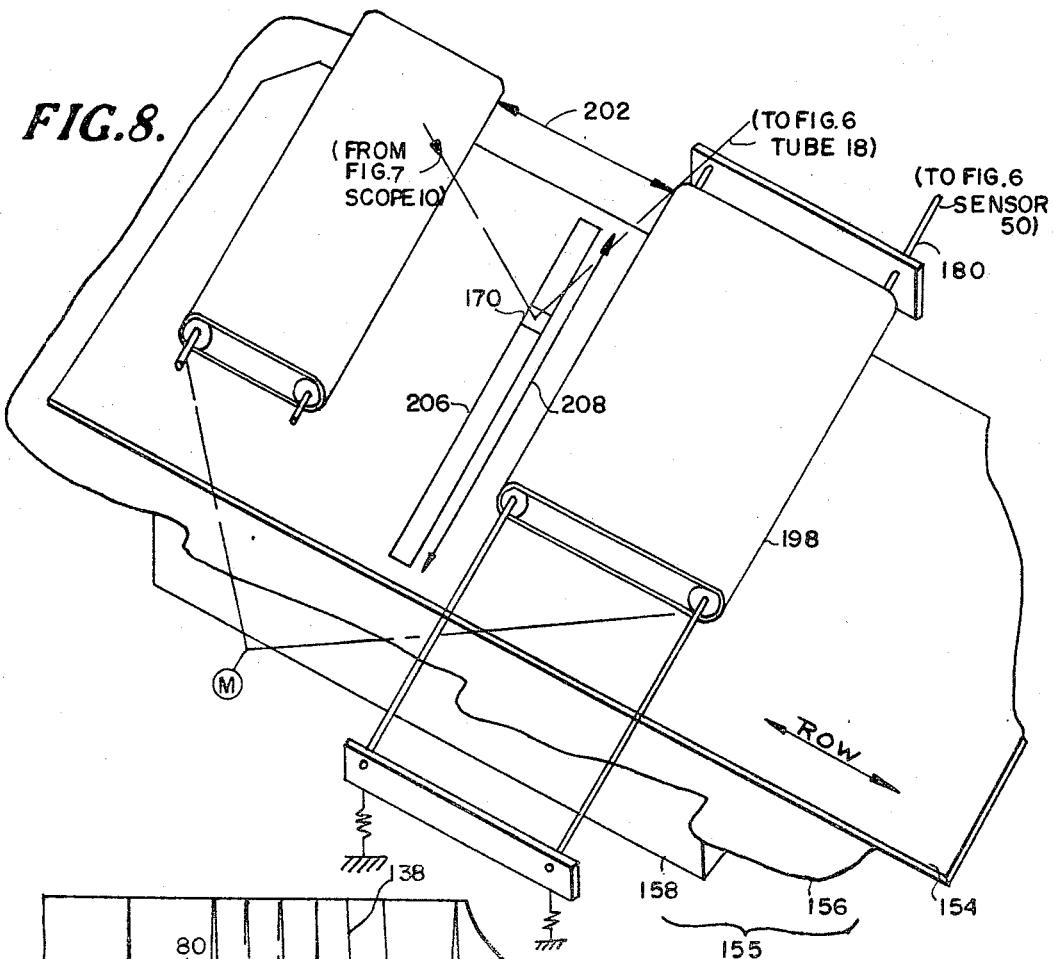
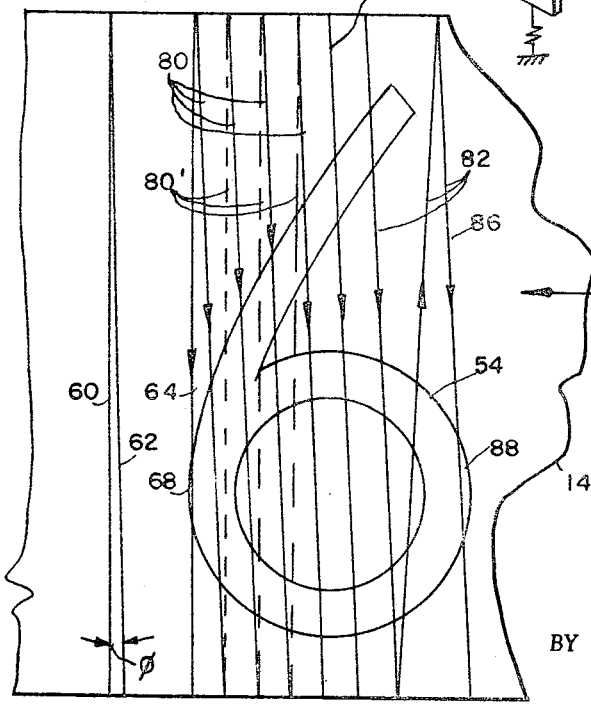

INVENTORS
CURTIS W. FRITZE
HOWARD L. DANIELS

BY *Cushman, Darby & Cushman*
ATTORNEYS

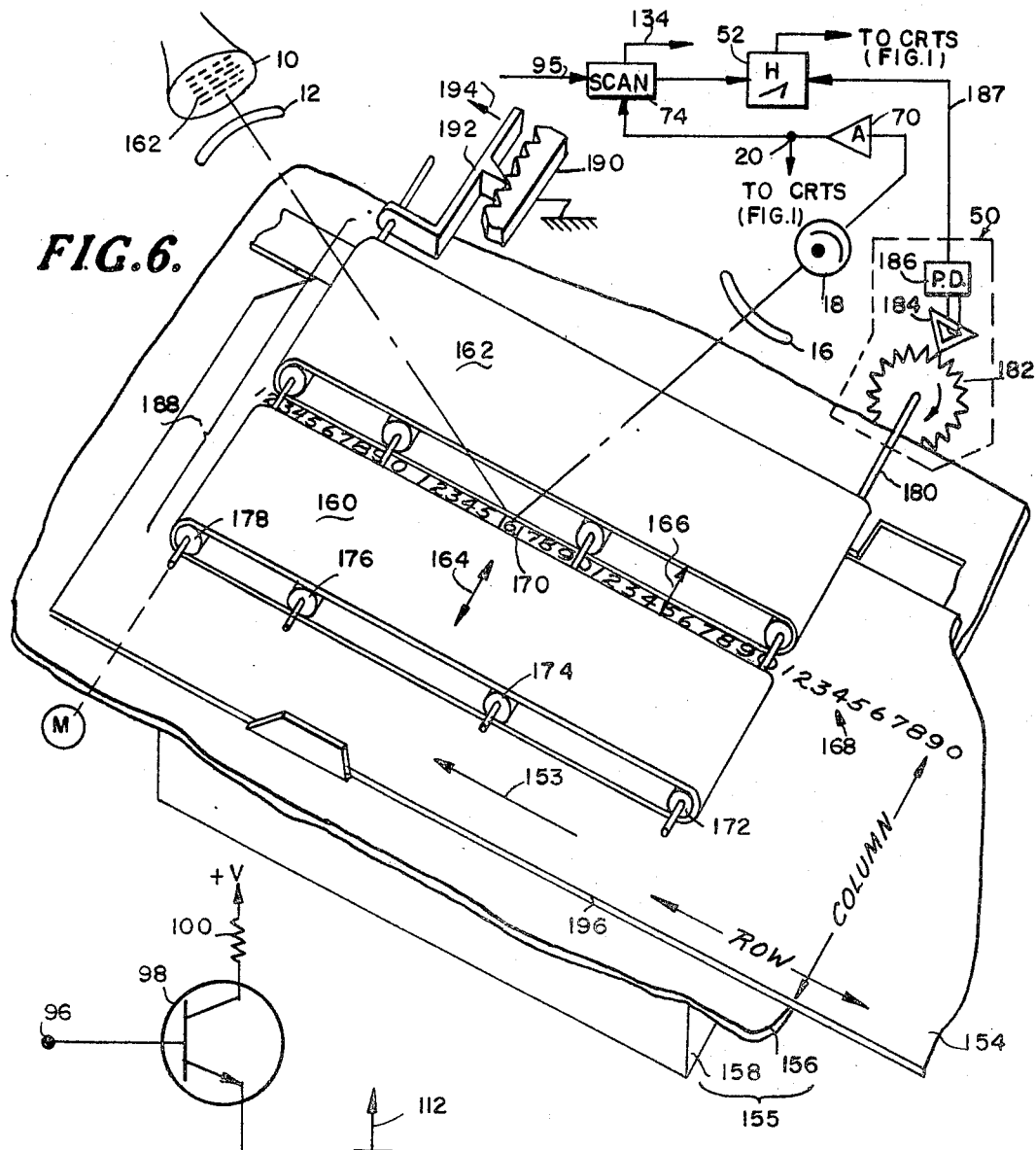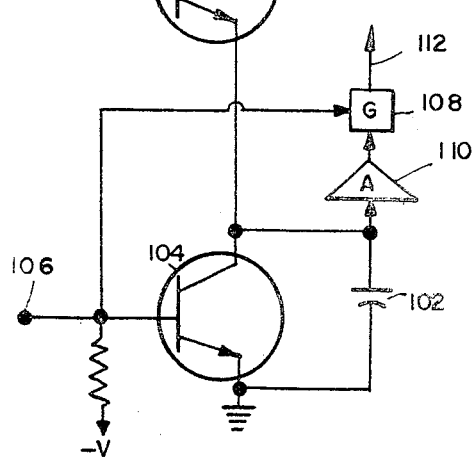

United States Patent Office
3,436,731
Patented Apr. 1, 1969

3,436,731
SYMBOL DETECTION
Curtis W. Fritze, St. Paul, and Howard L. Daniels, West St. Paul, Minn., assignors to Sperry Rand Corporation, New York, N.Y., a corporation of Delaware
Filed Mar. 11, 1960, Ser. No. 14,321
Int. Cl. G06k 7/10; H04q 3/04, 5/36
U.S. Cl. 340—146.3
4 Claims This invention relates to apparatus for detecting the significance of the configuration of written, typed, or printed symbols (or characters), and more specifically to a system which detects which symbol from a predetermined group of known symbols is present on a document.

In data processing systems there has been recent emphasis on automatic reading or sensing of written, typed or printed copy. Many schemes of varying reliability, speed, and ability have been proposed for detecting such symbols or characters. This invention provides apparatus which is capable of scanning and detecting many symbols in a very short period of time.

The symbols to be detected are scanned by a flying spot scanner, a television camera, or other suitable optical sensing means. A slit, which may be mechanical or optical, may be positioned effectively between the symbol to be detected and the scanning apparatus, such as to permit only one symbol for example to be detected at any one instant of time. The horizontal sweep of the scanner may be conveniently controlled by the initial detection of a symbol and the motion of the document containing the symbols to be detected, while the vertical sweep may be controlled by a sawtooth generator operating in synchronism with the rest of the system. The resulting video signal is fed to a plurality of small cathode ray tubes for example, to visually reproduce the symbol being detected. A mask or slit having a configuration representative of one predetermined symbol in toto, or in part as the representation of the unique areas distinguishing this symbol from all others in the group, is effectively placed between the cathode ray tube presentation of the reproduced symbol and respective photoelectric sensing means, i.e., each mask has a configuration representing a different symbol. One acceptable symbol is arbitrarily assigned to each mask. The light intensity impinging on each photoelectric sensing means associated with each cathode ray tube varies as the degree of likeness between the electronic reproduction of the symbol to be detected and the mask configuration. As a result, an electrical indication is provided showing which of the acceptable symbols is identical to a detected symbol.

Therefore it is an object of this invention to provide improved high-speed symbol detection apparatus.

It is another object of this invention to provide a system capable of being a completely electronic symbol detection apparatus.

It is a further object of this invention to provide a symbol detection apparatus which optically compares a television type presentation of the symbol to be detected with a plurality of acceptable symbols to determine the identity of the symbol detected.

It is still another object of this invention to provide symbol detection apparatus which enhances the probability of correct symbol detection by utilizing the analogue redundance of the information contained in the symbol to be detected.

Other objects and advantages of this invention will become obvious to those skilled in the art after a reading of this specification and examination of the appended drawings wherein:

FIGURE 1 illustrates an exemplary embodiment of this invention for scanning a single line or column of symbols;

FIGURE 2 illustrates a mechanical mask for comparing detected and displayed symbols with a given predetermined acceptable symbol;

FIGURES 3 and 3A illustrate the relationship of certain vertical sweeps with a typical symbol to be detected showing thresholds to be established when using one version of this invention;

FIGURE 5 illustrates an exemplary integrator circuit;

FIGURE 6 illustrates an exemplary transport mechanism and scanning arrangement which may be used in this invention;

FIGURE 8 illustrates an alternate embodiment of this invention for scanning a plurality of columns containing symbols;

FIGURE 11 illustrates a typical mixing circuit which may be used with the apparatus of FIGURE 9;

Figure 4:
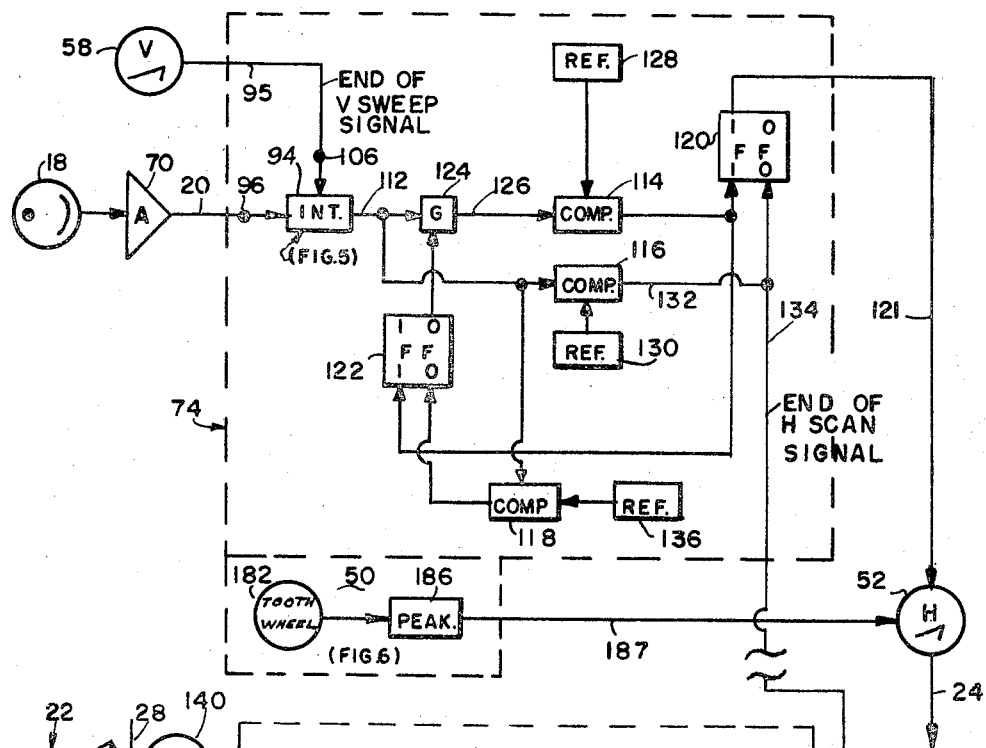
FIGURE 4 is a block diagram of an exemplary single scan generator and rate control.

With reference to FIGURE 1, a preferred embodiment of this invention is illustrated wherein a projection kinescope 10 produces a flying spot raster through lens system 12 to scan a symbol to be detected on a suitably supported document 14. The surface of document 14 reflects the flying spot impinging thereon through a lens 16 to a photoelectric cell such as photomultiplier tube 18 or any other photosensitive device thereby impressing a beam of varying light intensity on tube 18 according to the contour and color of the symbol(s) being detected. Photomultiplier tube 18 converts the varying light beam into a corresponding video signal (black and white) on line 20 which is fed to the z-axis (intensity electrodes of a plurality of cathode ray tubes (CRT's) 22. The deflection of the electron beams of each of the cathode ray tubes is synchronized with the deflection of the kinescope 10 by providing common horizontal sweep voltages over line 24 and common vertical sweep voltages over line 26 to both the kinescope 10 and CRT's 22. Thus on the face of each CRT 22 there is presented a replica of the area being scanned by projection kinescope 10. As will be later explained in the preferred embodiment of this invention, the symbol being detected is represented on the face of CRT's 22 as a dark area (no light) with a light background (high intensity light).

A more detailed description of a typical flying spot scanning system which is capable of performing the above described functions is described in the Radio-Electronic Engineering Edition of Radio and Television News, vol. 6, No. 4, April 1951, on pages 7A through 9A in the article by R. L. Kuehn and R. K. Seigle entitled "Rack-Mounted Flying Spot Scanner." Both electronic and mechanical flying spot scanners are well known in the art and for this reason will not be further described herein.

As hereinabove explained the symbol to be detected is reproduced on each and every CRT 22. Alternatively, one CRT may be used with a discrete picture area of the tube face being assigned to each different symbol. In other words, to detect any of ten different symbols for example, ten different CRT's (relatively small) may be employed, or alternatively a single CRT (relatively large) can be used with provision for causing ten different picture areas for simultaneously displaying the same detected symbol.

Immediately in front of each raster or picture area, e.g., on the face of each CRT 22, there is positioned a symbol mask such as mask 28 of FIGURE 2. Each symbol mask is non-translucent except for a translucent area in the form of one symbol conveniently termed an "acceptable symbol," i.e., one corresponding in configuration to one of a group of known symbols any one of which might be expected on the document being read. For example as shown in FIGURE 2, the translucent area may actually be an aperture illustrated by dotted line 34 shaped in the form of a numeral 6. Each mask has a different symbol.

Mask 28, being positioned adjacent the face of CRT 30 of FIGURE 1, is actually interposed between that CRT and a photosensitive device such as photomultiplier 32. The arrangement is such that only the portion of light generated on the face of CRT 30 coinciding with aperture 34 is passed through to photomultiplier 32. A preferable arrangement for accomplishing the above is to affix the mask 28 directly on the face of the CRT 30. For example, a metal mask may be constructed which will slide into a grooved mask holder (not shown) positioned next to CRT 30 such that the mask touches the face of CRT 30.

Cathode ray tubes 22 are preferably small, for example ones having a one inch diameter face. When a symbol is displayed as a dark character having a lighted background, the light from the face 30 of CRT 22 will pass to photomultiplier tube 32 only if the symbol replica on face 30 does not correspond to the configuration of aperture 34 in mask 28. For example, as in FIGURE 2, wherein the numeral 4 is shown superimposed over the aperture 34, it is apparent from inspection of the figure that at least a substantial part of the background light of symbol replica 4 will be admitted through aperture 34 to provide a substantial light source for photomultiplier 32. For example, light is admitted via areas 36, 38 and 40. It is apparent that only if a replica of the figure 6 is presented on face 30 will minimum light be admitted through aperture 34, thereby providing a light intensity null as indication of configuration coincidence between the symbol replica on face 30 and aperture 34. Of course, minimum light results in a minimum of current developed by photomultiplier 32. It is preferred to use a null as indication because it appears to be more reliable to operate around a zero light signal reference than to detect relatively small differences between large light intensities or electrical current amplitudes.

As above indicated, each mask 28 in front of each CRT 22 has a different shaped aperture, thus the aperture in each mask has a different symbol configuration from the apertures in every other mask. In a numerical system ten masks may have apertures shaped in the form of numericals 0 through 9 there being one numeral per mask. Obviously the system may be arbitrarily extended to any number of symbols, for example alpha-numeric or arbitrary shorthand notational systems.

The output currents from the photomultipliers 32, 42 and 44 of FIGURE 1 plus the intermediate photomultipliers (not shown) but indicated schematically by the dashed lines 46 are fed into apparatus in detector 48 which may be conveniently termed a "Best Fit Detector." Detector 48 compares the light intensities as detected by all photomultipliers just mentioned and determines which photomultiplier tube is receiving a minimum of light intensity. As a result of this comparison, detector 48 emits an electrical impulse indicating which symbol as represented by the aperture configurations in masks 28 coincides with the symbol replica produced on the faces of all CRT's 22. Detector 48 is provided with a number of output lines as hereinafter described which are equal in number to the number of acceptable symbols, one line being associated with each acceptable symbol. A pulse from detector 48 on one of the output lines at the termination of the symbol scanning period, as hereinafter explained, indicates which of the acceptable symbols is on the document. An absence of a pulse on any one of the output lines is indicative that the symbol on the document being scanned does not correspond to any of the acceptable symbols of the symbol detection apparatus.

This just described type of symbol detection may be referred to as analog detection since the light analog, i.e., the symbol replica of the printed or recorded symbol is effectively compared with images of all acceptable symbols, the closest match, if there is one, being defined as the symbol on the document. Prior art symbol detection apparatus use digital reconstruction methods of the symbol being detected. For example, reference is directed to U.S. Patent 2,663,758 to D. H. Shepard, which uses a mechanical scanner to break each symbol into discrete (digital) parts and a programmer to reconstruct the parts in a digital manner to determine which symbol is present on the document. Each of the symbol detection methods take advantage of the analog redundancy of information represented by the symbol inherent in the symbol itself. However, it should be noted that the digital reconstruction type systems utilize only that part of the above mentioned redundancy that is associated with each discrete portion of the symbol. This invention by utilizing the whole symbol in the detection process utilizes the entire redundancy contained in the *composite* symbol being detected which may be greater than the sum of redundancies contained in the individual parts thereof. It is axiomatic that if a system contains greater redundancy it is possible to make a more reliable operation provided one can take advantage of the additional redundancy. Thus it is that the reliability of symbol detecting apparatus constructed according to the teachings of this invention provides a more reliable symbol detection apparatus. Since each aperture may be designed within close tolerances to be the exact duplicate of one of the expected symbols and the replica of the symbol to be detected may be closely controlled, the sum of all portions of the symbol image not pertinent (redundant portions) to the information contained therein will aid in the detection of that symbol, i.e., assist in distinguishing a symbol from all other symbols.

It is understood that control functions in addition to the above mentioned apparatus are preferably included to provide a reliably operable symbol detector, for example to synchronize the CRT's with the document scansion and movement and to adjust for compensation of document velocity to obtain the same size symbol replicas on the face of each CRT 22 if the documents are to have different or varying velocities. If a document being read moves at a predetermined constant velocity while being scanned for symbols, the now described controls are not necessary to the operation of this invention. With reference to FIGURE 1 document 14 engages velocity indicator 50 to provide an electrical signal indicative of the document velocity to the horizontal sweep generator 52. The horizontal sweep of the kinescope 10 is arbitrarily made to be parallel to the direction of document motion regardless of the orientation of the symbol on said document. Thus are the document velocity is increased the horizontal sweep time is correspondingly reduced to provide a symbol replica of constant and uniform size on the faces of CRT's 22. That is, for a symbol of a given size, as the document velocity is increased the time it takes to scan the symbol is reduced. If the horizontal sweep time is constant the symbol replica will be distorted in that as document velocity is increased, the symbol replica dimension (on CRT's 22) in direction of the velocity would be diminished. The other dimension of course is unaffected. Thus velocity indicator 50 provides a voltage to vary the slope of the sawtooth wave generated by horizontal sweep generator 52. How a signal voltage can vary the slope of a sawtooth sweep generator is described in the book entitled Waveforms, vol. 19, of the Radiation Laboratory Series, on pages 265 and 266, McGraw-Hill, New York, 1949.

The operation of the embodiment shown in FIGURE 1 is such that a symbol is detected each time horizontal sweep generator 52 produces a single sweep. The sweep is initiated by photoelectrically detecting the presence of a symbol that has not previously been detected as will now be described. With reference to FIGURE 3 there is shown a symbol 54 to be detected on a document 14 moving in the direction of vector 56. Vertical sweep generator 58 (FIGURE 1) is continuously oscillating causing the flying spot to traverse an essentially vertical line 60. The velocity of the spot is much greater than the velocity of document 14 so that in a single vertical sweep, document 14 appears to be relatively stationary. As the document speed is increased the vertical sweep of the flying spot may form an angle $\phi$ with the vertical as indicated by line 62. If this angle $\phi$ becomes appreciable so as to cause distortion in the symbol replica on the CRT's 22 of FIGURE 1, velocity compensation must be provided to the vertical sweep waveform. However, for most applications of this invention this problem will not occur and is not considered important.

As document 14 proceeds to travel toward the left end of FIGURE 3, the symbol 54 comes under the vertical sweep of the flying spot as indicted by vertical sweep line 64. With momentary reference to FIGURE 3A, wave 66 represents the ideal current waveform from photomultiplier 18 (FIGURE 1) as it appears on line 67 during vertical sweep 64 (FIGURE 3). During an interval in which a light background is being scanned there is relatively large amounts of electrical current flowing through photomultiplier 18, while when sweep 64 crosses the black imprint of symbol 54 at point 68 there is a marked decrease in the intensity of the reflected light which substantially reduces the current through tube 18. This variation in light intensity, however, is not necessarily binary in nature, i.e., the light intensity can assume more than just two values; therefore, it is preferable to couple the output of tube 18 to a circuit which will definitely cause it to be a binary signal like waveform 66. Such a circuit is represented by binary amplifier 70 which, for example, can be a trigger circuit with predetermined thresholds for switching from one of two states and thus provide at a given time only one of two posisble electrical output signals preferably amplified. An example of such an amplifier is given by Puckle in the form of a Schmitt trigger circuit on page 57 of the book Time Bases, Wiley, 1943. As the current passes a given threshold in one direction a voltage is developed in such a circuit across a suitable input impedance to cause the binary amplifier to shift conduction states and when the current amplitude returns to that threshold from the opposite direction the binary amplifier re-shifts conduction states. Thus the binary amplifier follows the reflected light intensity in a binary fashion giving a positive going pulse (due to inversion in circuit 70) corresponding to the negative going pulse below threshold 72 in FIGURE 3A, which permits the symbol detector to ignore extraneous grey areas of the symbol or flaws in or on the document which could contribute to causing errors in symbol detection. For example, in the embodiment of FIGURE 1 the threshold between black and white was arbitrarily set as indicated by line 72 of FIGURE 3A. The threshold 72 is preferably adjustable to provide detection of symbols recorded by different recording apparatus; for example there are different impressions from a manual and an electric typewriter. A suitable manner of regulating the threshold 72 is to vary the input impedance of binary amplifier 70, thus varying the voltage produced by a given current from photomultiplier 18. If the light intensity to tube 18 is knowingly going to have substantially only two values due to the nature of the symbol impressions on the document, then a circuit for converting to a binary signal is unnecessary though amplification may be desired. In any event, a threshold determining circuit is desirable and this may be included in the tube 18 circuitry.

The output of binary amplifier 70 is fed to the CRT's 22 as heretofore described to form a sharp black-on-white replica of the symbol image. Additionally, parts of the video output signal from amplifier 70 are integrated to provide symbol scan threshold indications by a suitable integrator in scan generator 74 (FIGURE 1) as will now be explained. This integrator integrates the positive going output voltage pulses from binary amplifier 70. These pulses are above a predetermined threshold, which may be the lower binary voltage level from amplifier 70, and each corresponds to that part of the respective negative going pulses below threshold 72 in FIGURE 3A. Therefore, the voltage pulses indicative of black (no light) are integrated. For wave 66 of FIGURE 3A the integral of the output wave 66 below threshold 72, or the positive pulse from amplifier 70 corresponding thereto, appears as the sloping part of wave 76. When the positive pulses to be integrated are of sufficient duration to produce a voltage integration signal greater in amplitude than a predetermined threshold 78 which may arbitrarily be set as the horizontal scan initiation threshold, a horizontal scan may be initiated and one horizontal sweep (in a direction parallel to the document motion) accomplished, as later described in more detail, at the termination of the vertical sweep at which time the held integration voltage is sampled. The horizontal sweep causes the vertical sweep to effectively move across the symbol 54 following for example lines 80 (FIGURE 3); the dotted lines 80' indicate the blanked sweep return. It is to be understood that the number of vertical sweeps per horizontal sweep may be varied to suit the situation. Relatively few vertical sweeps, for example ten vertical sweeps per symbol scan (or horizontal sweep), are necessary to provide an operable embodiment. Alternatively, a sweep generally following lines 82 may be followed to eliminate blanking on the vertical sweeps. It is to be understood that the two types of sweep arrangements are shown for illustrative purposes and that in an actual embodiment either one of the types of sweeps patterns could be adopted. It is to be understood also that any raster pattern may be adopted for use with this invention, the requirement being that raster patterns on CRT's 22 and kinescope 10 be the same pattern but not necessarily the same physical size. It is preferred that the latter type, i.e., the one represented by lines 82, be adopted because of added simplicity to the system.

Termination of the horizontal sweep and thus termination of the symbol scan is caused by scan generator 74 when it detects the anterior edge of the symbol 54. This is accomplished simply by sampling the above mentioned integrator at the termination of each vertical sweep for a voltage which is less than a predetermined threshold amplitude, for example as indicated by line 84 in FIGURE 3A. An example of a scan termination with respect to vertical sweep 86 in FIGURE 3 which scans the anterior edge 88 of symbol 54 to produce wave 90 in FIGURE 3A is now described. The integral of wave 90 is indicated as the sloping portion of wave 92 which is less in maximum amplitude than threshold 84 and thus indicates that the horizontal symbol scan should be terminated. The last vertical sweep in a horizontal scan, such as sweep 86, may entirely miss the symbol to be detected and thus produce no or negligible integrated voltage in the scan generator 74. All that is required is that the amplitude of integrated voltage 92 be less than threshold 84.

Alternatively, the horizontal sweep may be designed to provide a predetermined deflection in the scanner and thus always scan predetermined area regardless of the width or extent of the symbol in the horizontal direction. The time of the sweep may be adjusted by the velocity indicator 50 in the same manner as for the previously described scanning method. Note that in either of the above mentioned scanning techniques the symbol replica will be placed on the extreme left of the scan raster on each of the CRT's 22, thus relatively narrow symbols such as "1" will not be centered on the presentation raster on the face 30 of CRT'S 22, though the widest symbol to be detected will be substantially central in each CRT raster. Masks 28 are constructed accordingly. By providing additional control circuits or by controlling the position of information on the document itself, the symbol replica can be centered on the CRT's 22, but this is felt to be unnecessary for successful operation of this invention.

FIGURE 4 contains a block diagram showing how the control operations can be conveniently and accurately performed. It is to be understood that there are several available means to accomplish the synchronization and scanning and that the illustrated apparatus is intended to be exemplary. With reference to FIGURE 4 the output of amplifier 70 (also shown in FIGURE 1) is fed into an integrating circuit 94 which integrates only the voltages indicative of currents from photomultiplier 18 from amplifier 70 which exceed threshold 72 (FIGURE 3A) in the black (no light) direction. Additionally, an end-of-vertical-sweep signal, derived as below indicated for example, is transmitted to integrator 94 via line 95 from vertical sweep generator 58 to reset the integrator to a predetermined reference potential and to readout the present voltage integral.

FIGURE 5 illustrates an exemplary integrator circuit capable of performing the above mentioned operations. The output of amplifier 70, preferably a binary signal, is applied to terminal 96 which is connected to the base electrode of transistor switch 98. If the output voltage from amplifier 70 is relatively negative, then transistor switch 98 is in its high impedance state and no or negligible current flows through charging resistor 100 and integrating capacitor 102. Thus there is no charge built up in capacitor 102 during such conditions. Now when binary amplifier 70 provides a positive-going pulse which is indicative of an absence of relatively high intensity light being received by the photomultiplier 18, i.e. the flying spot is hitting a black area on document 14, then transistor switch 98 assumes a very low impedance state during that pulse time to permit current to flow from +V through charging resistor 98 thence to charge capacitor 102 at a predetermined rate. If the capacitor charge is limited to the substantially linear portion of the charging curve, then the voltage charge on capacitor 102 will be linearly indicative of the time that transistor switch 98 is in a low impedance state, thereby indicating that a portion of the sampled vertical sweep has passed over a symbol part. In order to limit the charge on capacitor 102 to indicate the symbol part scanned by one vertical sweep, transistor switch 104 is added to the integrator. Normally switch 104 is in a high impedance state, thus having no affect on the operation of the integrator circuit including resistance 100 and capacitor 102. When vertical sweep generator 58 completes one sweep, a positive pulse is provided via line 95 to terminal 106 which is connected to the base electrode of transistor 104 and to output gate 108. This positive pulse may be derived from the flyback portion of the voltage sweep indicated by lines 80 in FIGURE 3, and may be compared to the blanking pulses generated in television cameras. If the sweep pattern illustrated as lines 82 in FIGURE 3 is utilized, a multivibrator may be conveniently used to drive an RC integrating circuit to produce a triangular vertical deflection waveform. In such a system the multivibrator output may be differentiated to produce an indication of end of the vertical sweep. In any case an electrical signal indicative of the end of a vertical sweep is obtained and suitably amplified if necessary, to provide a substantial positive voltage pulse which is of sufficient magnitude to make transistor switch 104 become highly conductive, thereby rapidly discharging capacitor 102 through the low impedance of transistor 104. Simultaneously with this discharge of capacitor 102, the pulse on terminal 106 is applied to gate 108, which may be a conventional diode AND circuit. Gate 108 permits the voltage from amplifier 110, which amplifies the voltage on capacitor 102, to be fed to line 112. Amplifier 110 may be a conventional DC amplifier with a high input impedance and thus can reliably provide an amplified indication of the voltage on capacitor 102. The inherent distributed capacity in amplifier 110 and its interconnections are used as a delay line so as to prevent the voltage indication on the output thereof from decaying as rapidly as the potential on capacitor 102. Because of this fact, the voltage indication of the integral as integrated by capacitor 102 is sustained a predetermined length of time sufficient to permit a comparison thereof in the FIGURE 4 comparators 114, 116 and 118 with predetermined reference voltages. It is obvious to those skilled in the art that many types of integrating circuits may be substituted for the illustrated circuit; in fact there are many integrating circuits which will provide a more linear integration than the illustrated circuit. An example of such a circuit is the conventional Miller integrator. For purposes of this invention the integration does not necessarily have to be linear to the same degree that television sweeps are made linear; all that is required is that the simple integrating circuit be limited to the more linear portion of the charge curve to at least a point which is distinguishably above threshold 78 in FIGURE 3A. Beyond this threshold the integrator does not have to provide additional information, thus it need not necessarily be linear. That is, the only purposes of integrator 94 is to determine whether or not either threshold 78 or 84 have been exceeded at predetermined times and the integration need be linear in these regions.

With reference again to FIGURE 4, the output of integrator 94 on line 112 is fed to three voltage comparator circuits 114, 116 and 118 which determine when thresholds 78 and 84 are exceeded and when the symbol that has been detected is no longer in the scanning area of kinescope 10 (FIGURE 1). These comparators may be of the well known "Multiar" type such as illustrated on page 343 of Waveforms, supra.

The horizontal scan signal produced by generator 52 is controlled by a bistable flip-flop 120. If flip-flop 120 is in its arbitrarily defined "1" state, then by virtue of the signal then conveyed over line 121, sweep generator 52 produces a sawtooth wave the slope of which is determined by velocity indicating means 50 as will hereinafter be explained in more detail with reference to FIGURE 6. The voltage from the "1" side of flip-flop 120 controls within sweep generator 52 the conduction of a vacuum tube or transistor switch which in turn controls the charging rate of a capacitor (not shown), which may be termed the horizontal sweep capacitor, much in the manner that the conductivity of transistor switch 98 in FIGURE 5 controls the charging of capacitor 102. If flip-flop 120 is in the "1" state then the capacitor in generator 52 is being charged and the horizontal sweep is being effectuated, whereas when flip-flop 120 goes to its "0" state, the horizontal sweep capacitor is discharged causing a horizontal sweep flyback and the horizontal sweep to be effectively inoperative while flip-flop 120 is in its "0" state. Thus the horizontal sweep lasts only as long as flip-flop 120 is in the "1" state. As will become more apparent from the following description, the horizontal sweep time may vary from symbol to symbol, thus flip-flop 120 provides synchronization between the horizontal scanning of the flying spot scanner and the position of the document.

Initiation of the horizontal sweep is caused by an output pulse from the comparator 114 setting flip-flop 120 to the "1" state. The input to comparator 114 may be gated by flip-flop 122 through gate 124 which may be a conventional diode AND circuit. Flip-flop 122 provides an indication of whether or not the output voltage from integrator 94 represents the first vertical sweep which crosses the symbol on the document being read (such as a sweep indicated by line 64 in FIGURE 3). Assuming that flip-flop 122 is in the "0" state, gate 124 passes the integrated voltage on line 112 to the input of comparator 114 by way of conductor 126. It will be recalled that the integrator output voltage, which is indicative of the total black area scanned in one vertical sweep, occurs only at the termination of the sweep as has been explained with reference to FIGURE 5. This voltage on line 126 may be fed to the input terminal of comparator circuit 114 wherein it is compared with a standard voltage from reference source 128. Source 128 may in its simplest form consist of a battery with the voltage taken through the adjustable tap of a potentiometer. Reference source 128 provides the threshold 78 of FIGURE 3A. Thus, the output of comparator 114 is indicative that a symbol on document 14, which has not been scanned, has been initially detected and is ready to be scanned. The output pulse from comparator 114 in addition to setting flip-flop 120 to the "1" state to cause initiation of a horizontal sweep, also set flip-flop 122 to the "1" state, thereby indicating to gate 124 by closing it that the first vertical sweep contacting a symbol has already occurred and that it is therefore unnecessary in a one horizontal scan per symbol type embodiment to initiate any further signal from comparator 114 for further horizontal sweeps as in a multiple horizontal scan per symbol embodiment. Setting flip-flop 122 to the "1" state prevents a series of pulses from comparator 114 and consequently prevents horizontal scans from being initiated as the symbol traverses the area in which symbols can be detected. Of course, no more than one horizontal scan could be initiated by successive pulses from comparator 114 unless flip-flop 120 gets set to its "0" state between two of such pulses, which happens as explained below at the anterior edge of each symbol. Thus, each symbol is scanned horizontally only once in the illustrated embodiment. Alternatively, however, it is possible (for example, by eliminating flip-flop 120 and gate 124) and in some cases desirable to permit additional horizontal sweeps to provide multiple scans for each symbol detection cycle for the purpose of insuring greater reliability.

Comparator 116 provides detection of the anterior portion of the symbol being detected, for example as indicated by the integrated voltage 92 in FIGURE 3A resulting from sweep 86 in FIGURE 3. Reference voltage source 130 which may be similar to source 128 is applied to comparator 116 in the usual manner to provide the FIGURE 3A threshold 84. To employ the above referenced Multiar type comparator, the voltage on line 112 may be inverted before being applied via line 129 to the input of the comparator. In this manner, as the positive voltage amplitude at the terminus of each vertical sweep on line 112 decreases, the inverted voltage would increase in amplitude in the positive direction. It is to be understood that comparator 116 is ineffective to provide a pulse on line 132 in response to any zero voltage output from integrator 94 which occurs between the times the integrated voltage is gated out to line 112. When comparator 116 detects the crossing of threshold 84 of FIGURE 3A, a pulse is emitted on line 132 which resets flip-flop 120 to "0" effecting a flyback of the horizontal sweep and a turning off of the horizontal sweep generator 52, thus terminating the horizontal sweep as hereinbefore explained. This pulse, conveniently termed "End of Horizontal Scan," is also sent over line 134 to a Best Fit Detector 48 as indicated in FIGURE 1. The Best Fit Detector is shown enclosed by dashed line 135 in FIGURE 7. This pulse on line 134 causes a comparison, as later explained in more detail, of all the photomultiplier outputs associated with CRT's 22 to determine the configuration of the symbol that has just been scanned. In this manner one horizontal sweep, or a plurality of horizontal sweeps if desired, provides at least one complete scan of a symbol which is sufficient to provide detectable replicas of the symbols on the faces of all the CRT's 22 and thus enable detection of the symbol as hereinabove described.

In FIGURE 4, comparator 118 provides for the detection of a complete absence of a symbol to permit resetting of flip-flop 122 to the "0" state. This in turn permits a subsequent initiating of a horizontal sweep of symbol scan when the next symbol to be detected is sensed. Comparator 118 operates in the same manner as comparator 116, except that reference source 136 is set to provide a threshold that is a substantially less positive voltage than threshold 84. This is done for the following reason. At the completion of one horizontal sweep the symbol being detected is still in the area of the flying spot due to the horizontal sweep flyback returning the spot to, say, one of lines 80 (if not line 64 or further leftward) in FIGURE 3. Thus, if the threshold of comparator 118 were set at a value substantially the same as that required to terminate the horizontal sweep, or if line 134 were connected to the "0" input side of flip-flop 122, the next vertical sweep after the horizontal flyback (for example sweep 138 in FIGURE 3A) could initiate a new horizontal sweep causing, in a one horizontal scan per symbol embodiment, a false indication of the presence of two or more symbols. The threshold embodied in comparator 118 is set such that a vertical sweep must entirely miss the symbol which was detected in order to indicate a space between two symbols on document 14. This arrangement insures that each symbol will be indicated only once by Best Fit Detector 48 regardless of the document velocity or time involved in detecting a symbol and assumes the horizontal sweep flyback will not move the spot leftward further than the front edge of the symbol just detected, which is the preferred situation for a single horizontal scan per symbol embodiment. This same type of circuit can be used with scanning systems employing multiple horizontal sweeps for a complete symbol scan. For example, the "0" input side of flip-flop 122 could also be connected to line 134 via a gate (not shown) which is enabled until a certain number of pulses occur on line 134.

As previously described, the replicas of the symbol being detected are respectively displayed on the faces of CRT's 22 of FIGURE 1. The replica, which is in the form of a primary light source, is masked by symbol masks, each symbol mask having its own symbol aperture aligned with and interposed between the face of a CRT and an adjacent respective photomultiplier. The current flowing in each such photomultiplier is an electrical analog of the degree of coincidence between the symbol replica and the aperture configuration. These currents are fed into Best Fit Detector 48 which may conveniently take the form shown enclosed by dashed line 135 in FIGURE 7. The output currents from photomultiplier tubes 140 represent the degree of coincidence between the replica of the symbol to be detected on CRT's 22 and the aperture configurations in masks 28. These currents are fed to a conventional summer and hold circuit 142 as well as respectively to a plurality of comparators 144 which may be of the above referenced Multiar type. The function of summer 142 is to provide an average value of all output currents from photomultipliers 140. This enables Best Fit Detector 48 to compensate for drifts in the electronic components, in the CRT's 22, in photomultipliers 140, as well as in the amount of light associated with different symbols. For improved stability of the symbol detector, the presentation system (comprising CRT's 22 and the photomultipliers 140) may conveniently employ degenerative feedback to control the intensity of the electron beams in each of the CRT's 22, thereby providing a relatively constant reference current from each of the photomultipliers 140. An example of a feedback system to control the intensity of a flying spot on a scanning CRT, but which can be equally applied to a CRT used to present symbol replica is given on page 255 in the article "Continuous Scanner for Televising Film" by R. E. Graham, Bell Laboratories Record, vol. 32, July 1954 issue, published by Bell Laboratories, New York, N.Y. Each pair of CRT's 22 and photomultipliers 140 can utilize the aforementioned feedback system. The intensity may be conveniently sampled at the termination of each horizontal sweep or it may be sampled at any arbitrary time.

The summer part of circuit 142 may be simply a resistive summer such as illustrated in FIGURE 18.1 in Waveforms, supra, while the holding circuit thereof may conveniently take the form of the circuit illustrated in FIGURE 5, but without gate 108, where the charging of the capacitor is through a low resistance and the output resistor of the above referenced summer is substituted for resistance 100. The output pulse from comparator 114 of FIGURE 4 which signifies the initiation of a horizontal sweep, i.e., symbol scan, can be applied to a terminal like terminal 106 of FIGURE 5 to discharge the capacitor quickly, while the "1" output of flip-flop 120 can be applied to a terminal like terminal 96 in FIGURE 5 to cause the capacitor to charge during each horizontal sweep, thereby permitting each scan to generate its own reference potential. This is desirable since subsequent symbols may have different degrees of blackness and thus may provide different output currents.

Figure 7:
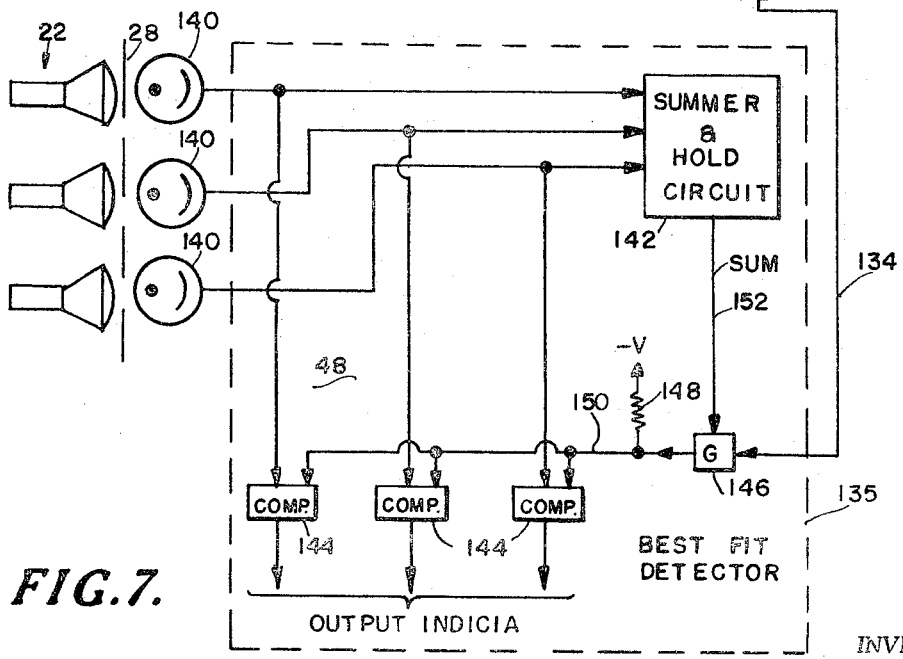
FIGURE 7 is a block diagram of an exemplary best fit detector.

An amplifier like amplifier 110 of FIGURE 5 as used in the holding circuit portion of the FIGURE 7 circuit 142, may include a DC level shifter and provide some voltage gain to effectively provide an adjustable threshold for reasons hereinafter explained. The output of such an amplifier is directed via line 152 to gate 146 which may be a conventional diode-resistor gate. Gate 146 is enabled by the symbol scan termination output pulse on line 134 from comparator 116 of FIGURE 4. Therefore, the average or threshold voltage derived from all photomultipliers 140 is applied to each comparator 144 only at the termination of the symbol scan. Alternatively, the average or threshold voltage from circuit 142 may be continuously fed to comparators 144 while the output currents from photomultipliers 140 are respectively gated to comparators 144 in the just described manner. The gating function of gate 146 is desirable to establish a time of comparison limited to the time when the replicas on the faces of CRT's 22 are complete, to prevent premature comparisons.

The negative voltage applied to resistance 148 provides a negative bias voltage to line 150 connected to all comparators 144 to prevent any output pulses therefrom prior to the proper sampling time as determined by comparator 116 of FIGURE 4. Resistance 148 is a high impedance so that when the gate 146 is enabled by a pulse on line 134, the low output impedance thereof causes the voltage on line 150 to assume the voltage on line 152 which is the output of summer and hold circuit 142, i.e. the above mentioned average or instant threshold voltage. The negative bias voltage on resistance 148 is made to exceed any expected voltages which may be developed from the maximum output currents in the input impedances of comparators 144 from photomultipliers 140.

As the voltage on line 152 is applied to comparators 144 through gate 146, there will be one and only one of the comparators 144 which has as a photomultiplier minimum current input indicative of coincidence between the symbol replica and the mask aperture associated therewith. This minimum current can be conveniently converted to a voltage by passing it through a fixed resistance and compared with the instant average or threshold voltage from circuit 142. If the outputs from photomultipliers 140 are respectively directed to the input terminal of the Multiar type comparator 144 as illustrated in FIGURES 9–20 of Waveforms, supra, and the threshold voltage is applied to the reference voltage terminal thereof, the threshold voltage will exceed only one of the input voltages from photomultipliers 140; thus only one of the comparators 144 will provide a pulse output indicating which symbol is on the document 14. The gain of the DC level shifter contained in the hold circuit of 142 is adjusted for each set of acceptable symbols so as to provide a threshold between the symbols most resembling each other. Thus there is shown apparatus which can reliably detect symbols on a document.

To enable high speed symbol detection of many symbols, suitable document transport apparatus must be provided in conjunction with the just described symbol detection apparatus. Obviously, this transport apparatus can take any one of many possible forms depending on the documents desired to be automatically read. Tape documents for example, cash register rolls, or teleprinter tapes could be transported by apparatus such as the transport mechanism described in the article beginning on page 250 of Bell Laboratories Record, supra. To store large amounts of diversified data which requires different criteria for different information retrieval operations, card record systems have proved to be very flexible and economical. Therefore, it is preferred that this invention be used with cards possibly of the same size and shape as the conventional "punched tabulating cards" used with the well known tabulating equipment. When using such cards with this invention it is not necessary to punch holes in the cards as would normally be done when the cards are used with tabulating equipment employing card perforation sensing brushes. Rather the information is recorded on the cards by printing or typing the information in a predetermined format. It is obvious to those skilled in the art of information recording and retrieval that this invention can greatly enhance the storage capacity and retrieval procedures of the card type of records. In using the cards in the usual manner of either punching or not punching holes therein to represent information, the record capacity of a so-called 90 column card which uses six recording positions per card column is $2^{540}-1$ bits of information. If this invention is utilized with such cards and the number of discrete symbols permitted in the information storing system is arbitrarily limited to ten, the increase in maximum information content of a single card is $10^{540}-2^{540}$ bits of information. As the number of permitted discrete symbols is increased, the increase in information content of each unit record or card is exponentially increased accordingly.

Because of the large installations of punched cards and the integration of present day tabulating equipment into business and industrial operations, it may be desirable as an interium measure to combine the advantages of this invention with some of the techniques of the tabulating equipment and systems. Therefore, informaiton may be recorded on these so-called punched cards in both forms, some in the form of holes or no hole while the remainder or duplicate information thereon may be recorded in printed or typed symbol form. In this way the tabulating machinery may be used in conjunction with this invention.

FIGURE 6 illustrates an exemplary apparatus for transporting a card document 154 such as a well known 90-column tabulating card to be read by scanner 10 and typical apparatus for synchronizing the hereinabove described symbol detection apparatus with the travel of said card through the card sensing station illustrated. Card 154 may be taken from a stack of such cards in the usual manner and transported to the illustrated apparatus in the conventional manner of transporting cards in tabulating equipment. After the card 154 has been read in the particular reading station it may be restacked in the usual manner. Note that the travel of card 154 as indicated by arrow 153 is endwise rather than lengthwise. This is an arbitary choice and either mode of transporting the card may be conveniently utilized. In tabulating machinery it is conventional to transport and operate with the cards in a lengthwise direction. Modification of the transport apparatus to accommodate the indicated type of travel, i.e. endwise, merely requires the width of the transport apparatus be narrowed such as by metal guide plates disposed into the transport channel, i.e. directly over the rollers of the transport apparatus.

In FIGURE 6, card 154 preferably rides in a substantially frictionless manner on a film of air produced by means of air flowing through an air permeable membrane or thin plate 156 which is disposed over air chamber 158. A suitable air compressor system (not shown) supplies compressed air at a predetermined rate and pressure to chamber 158, the air then disperses through plate 156 to maintain card 154 at a predetermined spacing over the plate, i.e. the card effectively is supported by the air moving through plate 156. Operation of such an air permeable plate is described by Anderson et al. in U.S. Patent 2,612,566. Substantially improved operation may be conveniently provided by drilling a plurality of holes in a metal plate thereby providing a more constant pressure on all parts of card 154. Still a much improved arrangement for providing an air bearing is to substitute a sintered metallic plate for the drilled plate thereby providing relatively even air flow to all parts of card 154 from chamber 158.

Movement of card 154 through the scanning station of FIGURE 6 is maintained at a predetermined rate by driven belts 160 which are disposed over plate 156 sufficiently close thereto so as to be situated in the boundary layer of air. Belts 160 are so disposed so as to force card 154 downward into the air coming up through an air distributing device 155. Because of the high efficiency, i.e. practically frictionless operation, of the transport system it is valid to assume there is negligible or no slippage between belts 160 and card 154, at least during the period of transport when card 154 has been engaged by said belts. The two driven belts 160 are preferably arranged to form a mechanical mask between document 154 and the projection scanning apparatus including kinescope 10, such as described in FIGURE 1. Kinescope 10 provides a flying spot, i.e. a moving electron beam, following generally a raster as indicated by numeral 162. The spot is focused by lens system 12 into the space 166 between driven belts 160 so as to impinge on document 154 only on that portion thereof located in space 166. The spot is reflected from document 154 to phototube 18 via lens system 16 as aforedescribed.

The vertical sweep raster 162 is in a direction normal to the direction of movement of document 154 as indicated by vector 164 providing a symbol scanning operation as heretofore described. Driven belts 160 are separated by space 166 at least greater than the maximum height of any expected symbols in the row of symbols 168 being scanned. The horizontal scan of the symbols in row 168 may be accomplished as the document 154 traverses the scan area 170, each symbol being scanned in the aforedescribed manner.

Belts 160 are tautly mounted on idler rollers 172, 174, 176 and on drive roller 178. Idler 172 extends on axle 180 to toothed wheel 182 to provide velocity information indicia to velocity sensor 50 (FIGURE 1). The speed of rotation of wheel 182 is indicative of the velocity of drive belts 160 and thus indicative of the velocity of the document 154 as it passes between belts 160 and air exuding device 155. The periphery of wheel 182 may be of magnetic material deformed as by knurling or notching for example. A magnetic reproducing head 184 is placed in juxtaposition with the deformed periphery such that as wheel 182 rotates, the deformed periphery provides a varying reluctance magnetic circuit to any magnetic signals in head 184. When the deformity on the periphery is made in a regular manner, the frequency of the variation of reluctance in head 184 is indicative of the peripheral velocity of wheel 184, thereby indicating the velocity of document 154. Peak amplitude detector 186 which includes a source of alternating voltages is connected to head 184. Interconnection of peak detector 186 and head 184 is now explained.

Head 184 in combination with an alternating voltage source (not shown herein) acts substantially as a magnetometer such as described in U.S. Patent 2,649,568. The dipole 14 shown in that patent may represent the outermost deformed metal of the deformed periphery of wheel 182, oscillator 6 therein may be employed as the above mentioned source of alternating voltage, and meter 16 of that patent is a peak detecting circuit such as illustrated on page 507 of Waveforms, supra, corresponding in conjunction with the oscillator to the peak amplitude detector 186 in FIGURE 6. Alternatively, wheel 182 may have a megnetic coating on its periphery with magnetic spots recorded thereon. Movement of wheel 182 past head 184 induces in any windings connected thereto a voltage which may be fed to peak detector 186 to provide an indication of the velocity of wheel 184. In either of the two mentioned means for detecting velocity, as the velocity is increased the amplitude of the indicating voltage also increases in amplitude. By calibrating the peak detector to measured velocities, accurate velocity indication is obtained.

The output voltage of peak detector 186 after being suitably amplified and shaped if desired, is applied over line 187 to the horizontal sweep generator 52 to modify the slope of the horizontal deflection waveform as previously described. As the velocity of document 154 is increased, the voltage output of sensor 50 is likewise increased to provide a steeper deflection wavefront thereby maintaining a symbol replica of constant size and without distortion on the face of all CRT's 22 for all velocities of document 154.

To adjust the apparatus of FIGURE 6 to accommodate different rows of symbols, drive roller 178 and idler 172 may be mounted on splined shafts to allow the whole roller-belt assembly 188 to be adjusted to read any arbitrarily selected row of symbols on document 154. To provide accurate positioning of the assembly 188, a notched detent 190 may be provided to engage spring arm 192 slidably mounted on a suitable fixed support (not shown). The positioning of assembly 188 may be manually changed by springing arm 192 in the direction of arrow 194, moving the assembly to the desired position and then releasing arm 192 to re-engage detent 190. In this manner driven belts 160 may be adjusted laterally of the longitudinal document movement to permit reading of all rows of document information symbols by one single row reader.

Thus there is shown apparatus to detect and read symbols recorded on a document, transport means to move the document into different reading positions and masking means to prevent detection and reading of two adjacent symbols simultaneously.

According to the teachings of this invention a plurality of rows of information symbols may be electronically scanned in the form of a column of such symbols. That is, if the symbols along a straight line parallel to the long edge 196 of document 154 such as indicated generally by numeral 168 are termed a row of symbols, then all symbols lying in a straight line perpendicular to the long edge 196 may be termed a column of symbols. Then in scanning the document 154 driven belts are provided in the form shown in FIGURE 8. The air exuding device 155 can be the same structure as shown in FIGURE 7. The driven belts take the form of belts 198 and 200 which engage document 154 in the same manner as described for driven belts 160. A large space 202 is provided between belts 198 and 200 to permit a modified raster causing the flying spot not only to scan area 170 but to scan area 206. The length distance 208 of scan area 206 is adjustable as will be later described.

Figure 9:
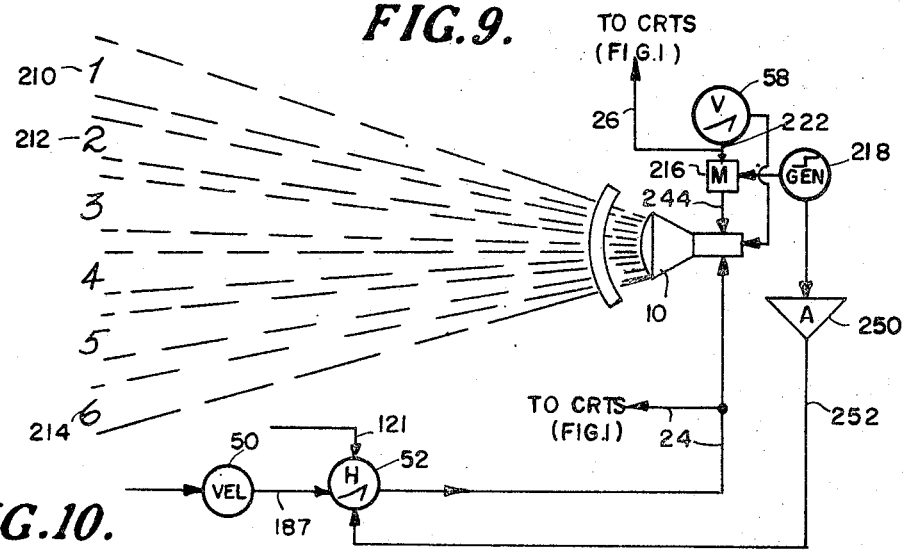
FIGURE 9 illustrates the modification required to perform multiple row scanning.
Figure 10:
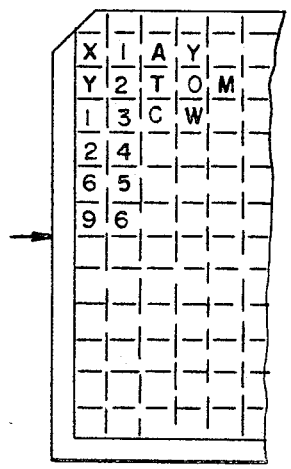
FIGURE 10 illustrates a segment of a typical tabulating card.

The scanning apparatus illustrated in FIGURE 1 is modified by the addition of the apparatus illustrated in FIGURE 9 to the scanning control circuits hereinafter described. The embodiment used in FIGURE 9 to illustrate multiple row electronic scanning shows scanning 6 rows, i.e. one half of a standard tabulating card such as illustrated in FIGURE 10, though it could scan more or less rows as desired. The sequence of scanning is such that the upper symbol indicated by numeral 210 in FIGURE 9 is scanned and detected first, symbol 212 is scanned and detected next, and so on until symbol 214 is scanned and detected. Completion of the symbol 214 scan corresponds to the "End of Horizontal Scan" signal present on line 134 of FIGURES 1, 4, 7 when that scanning apparatus has completed the scan of a single symbol. Initiation of the extended scan operation can be performed in the same manner as described with reference to FIGURE 3. Suitable tracking apparatus may be utilized if desired to keep the scans on the symbols in the same exact relative position. The well known photoformer (function generator) techniques may be utilized to provide the track-while-scan function. Best-Fit-Detector 48 in most cases compensates for misalignment of the symbol reproduction on CRT's 22.

The vertical scan generator 58 remains unchanged, producing the synchronization to all apparatus in the system as previously described. A mixing circuit 216 is interposed between vertical scan generator 58 and flying spot scanner 10. The vertical deflection signals are transferred to CRT's 22 over line 26 as described for FIGURE 1. Mixing circuit 216 provides adjustment of the vertical scan signal from generator 58 to accommodate the area 206 in a predetermined number of discrete areas, one area for each symbol to be scanned in the symbol row comprising area 206. That is, the sawtooth signal from generator 58 is applied to a DC voltage from a step-type generator 218 to adjust the deflection of ginescope 10 to scan a succession of discrete areas the size of area 170 but displaced therefrom in area 206. The mixing circuit 216 is shown in FIGURE 11.

Figure 12:
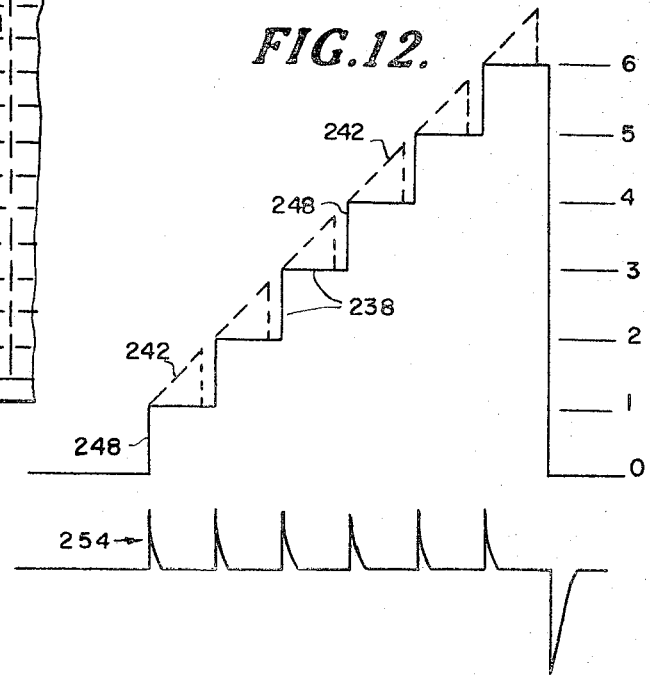
FIGURE 12 illustrates a waveform obtained from the step generator in FIGURE 9.
Figure 13:
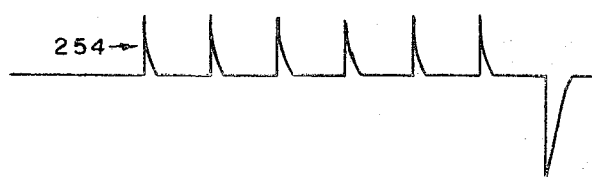
FIGURE 13 illustrates the waveform obtained when the wave of FIGURE 12 is differentiated.

With reference to FIGURE 11, terminal 220 is connected to line 222 of FIGURE 9 and transfers the vertical deflection signal from sweep generator 58 through isolation diode 224 thence through AC coupling capacitor 226 to junction 228. Resistive impedance 230 is coupled at one end to terminal 232 which provides a bias voltage thereto. The other end of resistance 230 is coupled to junction 234 which is interposed between diode 224 and condenser 226. Resistance 230 provides a voltage recovery path for capacitor 226 during flyback of the vertical deflection signal. Terminal 236 is coupled to step generator 218. A wave such as shown by solid line 238 of FIGURE 12 is supplied to terminal 236 from generator 218 as will be explained. Generator 218 may be of the "storage counter" type, for example as illustrated in Pulse and Digital Circuits, by J. Millman and H. Taub, McGraw-Hill, New York, 1956, pp. 346–352. The output wave of such a counter is the well known step function such as wave 238 of FIGURE 12. DC amplifier 240 in FIGURE 11 couples terminal 236 to junction 228 providing the wave 238 thereupon. Since the vertical deflection signal from generator 58 is AC coupled to junction 228, the deflection signal will be added to the step wave 238 as indicated by dotted line waves 242 in FIGURE 12. This composite wave is provided to the vertical deflection circuits of kinescope 10 over line 244. Junction 228 of FIGURE 11 is coupled to line 244 by DC amplifier 246. It is apparent to those skilled in the art that the composite wave comprising waves 242 and 238 will provide deflection of the flying spot to cover an extended distance 208 with successive horizontal scans scanning all symbols in area 206 by successively scanning a plurality of areas the size of area 170. In FIGURE 12 the step wave 238 positions the vertical sweep voltages 242 successively over symbol 210, 212 etc. through symbol 214. The amplitude of the sweep voltages 242 is less than the amplitude of the step risers 248. The difference in amplitude between the step rising voltages 248 and maximum vertical sweep voltages 242 provides for skipping the space between adjacent symbols in a row of symbols. A difference in amplitudes is not absolutely necessary to the operation of this invention; however it is preferred as tolerances are increased.

The horizontal scan generator 52 must also be synchronized with the vertical scan generator 58 such that the horizontal sweep voltage applied to the flying spot scanner 10 is repeated each time the vertical scan signal advances to a new level, i.e., each time the count from step counter 218 is advanced. In other words, each time the counter 218 is advanced, a new symbol in the column is ready to be sensed, and hence the horizontal scan must be rendered operative.

A convenient means of accomplishing this synchronization is shown in FIGURE 9. The step voltage output 238 is impressed on a differentiating type amplifier 250 thereby producing an output on line 252 resembling wave 254 of FIGURE 13. This wave, which as a result of the differentiation has a plurality of recurrent positive going voltage spikes, is used as a trigger source for horizontal sweep generator 52. This trigger source is used to enable generator 52 to produce such a triangular horizontal sweep when further enabled by a signal on line 121 from flip-flop 120 of FIGURE 4. Therefore, each time generator 52 receives a trigger pulse via line 252, a horizontal sweep voltage is soon initiated (assuming a symbol is initially detected) and applied to scanner 10 and CRT's 22. The period of this sweep may be made adjustable (as by setting the R–C time constant of the sweep generator) such that the sweep is terminated slightly before step generator 218 advances its output to a new level. This insures that the horizontal scan is not functioning during the interval in which the vertical sweep is being stepped from one symbol to another. This protective measure, however, is not absolutely required since the horizontal scan is controlled such that it becomes operative only when the symbol has been initially detected as above described in connection with FIGURES 3, 3A, 4. Similarly, the horizontal scan is automatically terminated when the anterior edge of a symbol is detected as is more completely described above in connection with those figures. However, the above described timing control may be desirable as an additional safety feature to improve the system reliability.

Thus it can be seen that there is provided by this invention a means whereby the foregoing objects and advantages herein set forth may be successfully achieved. Modifications of this invention not described herein will become apparent to those of ordinary skill in the art after reading this disclosure. For this reason the foregoing drawings and detailed description should be construed as illustrative and not limitative, the scope of the invention being defined in the appended claims.

What is claimed is:

1. Apparatus for detecting and indicating the presence on a document of any one of a plurality of different known symbols of known configuration comprising a flying spot scanner, means for effecting a sweep of the flying spot in a first direction across said document, means for effecting a sweep of the flying spot in a second direction normal to said first direction with the first direction sweep being at a substantially higher rate than the second direction sweep, means for moving said document in a direction parallel to said second sweep at a rate substantially less than the movement of the flying spot in said second direction, means for receiving the reflected light from said document due to said flying spot and providing an output signal, means for making the output signal from said receiving means have a binary characteristic and for providing a given threshold beyond which a pulse is produced therefrom each time and only when the flying spot scans a part of a symbol to the exclusion of extraneous matter in any scanned area on the document, a plurality of cathode ray tubes each coupled to the first and second direction sweep effecting means and to such pulses for displaying a picture of each symbol scanned, a plurality of masks respectively placed adjacent the cathode ray tube faces, each mask having an aperture with the mask apertures respectively corresponding in configuration to the configuration of the said different symbols, means for generating end of first sweep signals, means responsive to said pulses and to said end sweep signals for controlling the initiation and ending of the sweep in said second direction including an integrator for integrating said pulses and means for comparing the integration signal at the end of each first direction sweep with a first predetermined potential and with a second predetermined potential which is lower in value than said first predetermined potential for respectively generating second direction sweep starting and stopping signals, a plurality of photoelectric devices respectively disposed on the side of the respective masks opposite the cathode ray tube faces, means for averaging the outputs of said photoelectric devices and for temporarily holding a signal related to that average, a plurality of comparators respectively connected to the outputs of said photoelectric devices, gating means responsive to the signal for ending the second direction sweep for gating said average related signal to the comparators for causing a determination therein of which, if any, of the outputs of said photoelectric devices is less than said average related signal to indicate which of the said different symbols was present on said document and scanned.

2. Apparatus for detecting and indicating the presence on a document of anyone of a plurality of different symbols of known configuration comprising: means for effectively scanning a predetermined area of a document in a first direction with a beam of light; means for effecting movement of said beam in a direction substantially normal to said first direction; means responsive to the light reflected from said area for developing an electrical signal each time said beam crosses any part of a symbol on said document; a plurality of cathode-ray tubes equal in number to the number of discrete symbols to be detected; means for synchronizing the sweep voltages applied to said tubes with said scanning means for displaying in response to said electrical signal exceeding a predetermined threshold a replica of the symbols being scanned; a plurality of masks each having an aperture configuration corresponding to the configuration of said discrete symbols to be detected and disposed adjacent the faces of respective ones of said tubes; a plurality of sensing means for sensing the amount of light passing through apertures from said tubes, means connected to the outputs of said sensing means for developing an electrical signal proportional to the average value of the output signals from said sensing means; a plurality of comparators equal in number to the number of discrete symbols to be detected, each having a pair of input terminals one of which is connected to the output terminals of respective ones of said sensing means; and means connecting the other of said input terminals on all of said comparators to the output from said signal developing means to cause an output from anyone of said comparators whose first input terminal is receiving an output from said sensing means less in amplitude than the signal corresponding to said average value.

3. Apparatus for detecting and indicating the presence on a document of anyone of a plurality of different known symbols of known configuration comprising: a flying spot scanner for effectively scanning a predetermined area of a document in a first direction with a beam of light; means connected to said scanner for effecting movement of said beam in a direction substantially normal to said first direction; photoelectric means responsive to the light reflected from said area; level sensitive amplifying means connected to the output of said photoelectric means for developing an electrical signal each time said beam crosses any part of a symbol on said document; a plurality of cathode-ray tubes equal in the number to the number of discrete symbols to be detected; means for synchronizing the sweep voltages applied to said tubes with the sweep voltages applied to said scanner for displaying on the face of said cathode-ray tubes a replica of the symbol being scanned; a plurality of masks each having an aperture configuration corresponding to the configuration of said discrete symbols to be detected and disposed adjacent the faces of respective one of said tubes; further photoelectric means located in front of said mask for sensing the amount of light passing through said apertures from said tubes; a plurality of comparators coupled at one input to receive as input signals the outputs of said further photoelectric means; means including summing means coupled between the outputs of said photoelectric means and a second input of each of said comparators for providing thereto an input signal related to the average value of the outputs from said photoelectric means; and gating means responsive to the termination of said second sweep signal for gating to each comparator one of the input signals to thereby cause the comparator to determine which, if any, of the photoelectric means outputs is less in amplitude than the signal related to the average value of the outputs from said photoelectric means.

4. Apparatus for detecting and indicating the presence on a document of any one of a plurality of different known symbols of known configuration comprising: means for moving a document bearing symbols to be detected past a reading station; means for scanning a predetermined area of said document in a first direction with a beam of light; means for sensing the amount of light reflected from said area and for developing an electrical signal of at least a predetermined magnitude each time said beam crosses any part of a symbol on said document; means for effecting movement of said beam in a second direction substantially normal to said first direction; means for varying the speed of movement of said beam in said second direction as a function of the velocity at which said document passes said reading station; a plurality of cathode-ray tubes equal in number to the number of discrete symbols to be detected having their sweep voltages synchronized with said scanning means for displaying in response to said signals exceeding said predetermined magnitude a replica of the symbol being scanned on the faces of said tubes; a plurality of masks each having an aperture configuration corresponding to the configuration of said discrete symbols to be detected disposed adjacent to the faces of respective ones of said tubes; means for sensing the amount of light passing through said apertures from said tubes; and means for comparing the outputs of said light sensing means for indicating which, if any, has an output below a preset level, said level being proportional to the average value of the outputs of all said light sensing means.

References Cited

UNITED STATES PATENTS

| | | | |
|---|---|---|---|
| 2,919,425 | 12/1959 | Ress et al. | 340—149.1 |
| 2,919,426 | 12/1959 | Rohland | 340—149.1 |
| 2,889,535 | 6/1959 | Rochester | 340—149.1 |
| 2,762,862 | 9/1956 | Bliss | 340—149.1 |
| 2,928,073 | 3/1960 | Greanias | 340—149.1 |
| 2,933,246 | 4/1960 | Rabinow | 340—149.1 |
| 2,685,615 | 8/1954 | Biddulph et al. | 340—149.1 |
| 3,000,000 | 9/1961 | Eldredge | 340—149.1 |

MAYNARD R. WILBUR, *Primary Examiner.*

U.S. Cl. X.R.

340—149